United States Patent [19]

Chen et al.

[11] 3,742,912
[45] July 3, 1973

[54] AUTOMATIC FEEDER FOR AQUATIC ANIMALS

[76] Inventors: David T. Y. Chen; Ten Fuh Shih, both of c/o T. C. Huang & Associates, 592 Lin Shen North Road, Taiwan, China

[22] Filed: July 7, 1971

[21] Appl. No.: 160,372

[52] U.S. Cl. .................................. 119/51 R, 119/5
[51] Int. Cl. ............................................ A01k 61/02
[58] Field of Search ............................ 119/51, 5, 3

[56] References Cited
UNITED STATES PATENTS 3,512,505   5/1970   Cross et al. ...................... 119/51 R
2,718,211   9/1955   Pettas ............................... 119/51 R Primary Examiner—Hugh R. Chamblee
Attorney—William A. Strauch, James E. Nolan et al.

[57] ABSTRACT

An automatic fish feeder in the form of an open bottom tube containing an elongated layered body of fish food, a feed access screen across the tube bottom supporting the food body which descends by gravity as it is consumed. The tube interior is pressurized to limit the column of water therein to moisten only the lower end of the food body, either by introducing a gas under pressure from an external source, or by producing gas under pressure from the moistened food body.

13 Claims, 9 Drawing Figures

PATENTED JUL 3 1973
3,742,912
SHEET 1 OF 2
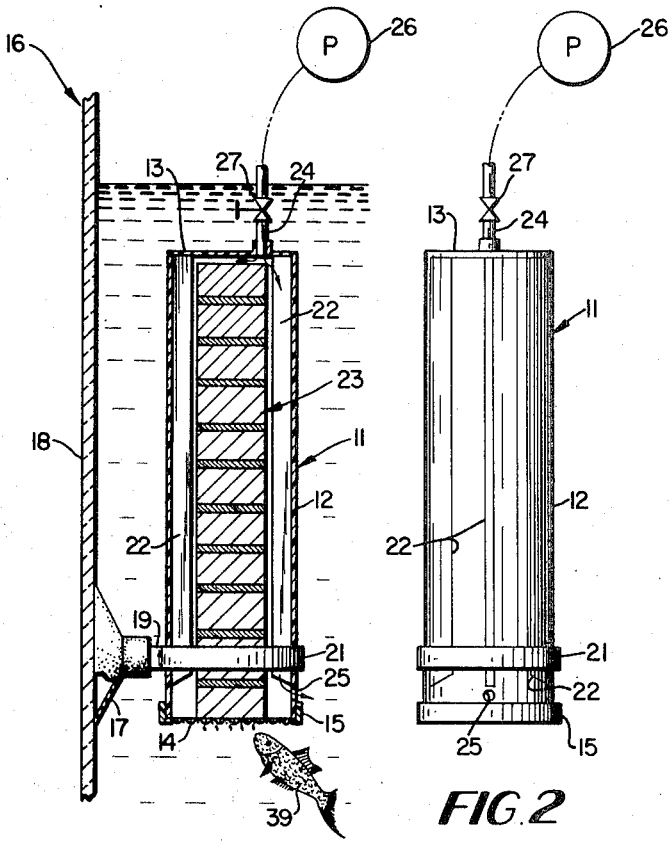
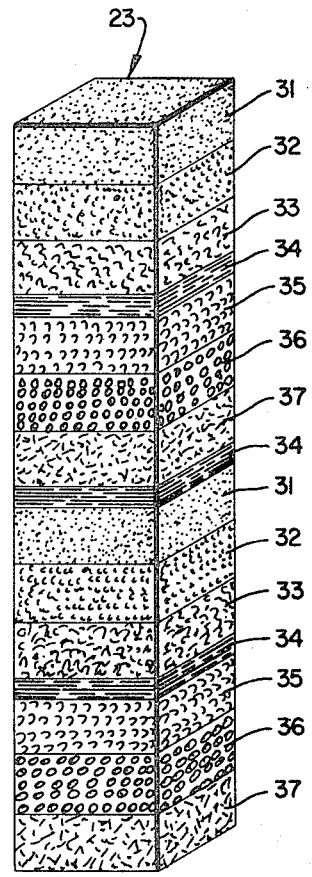
FIG. 4
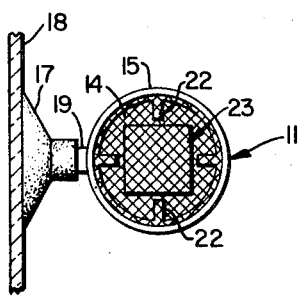
FIG. 3
INVENTORS
DAVID T. Y. CHEN
TEN FUH SHIH
BY Strauch, Nolan, Neale, Nies & Kurz
ATTORNEYS

INVENTORS
DAVID T. Y. CHEN
TEN FUH SHIH

AUTOMATIC FEEDER FOR AQUATIC ANIMALS

BACKGROUND AND HISTORY OF THE INVENTION

This invention relates to an automatic feeder for raising aqautic animals such as fish. In a preferred embodiment the feeder is a transparent plastic or glass container removably attached to the inner wall of the fish tank as by a suction cup.

Existing methods of feeding fish in aquarium tanks comprise scattering feed particles, mostly buoyant, upon the water, setting trays of feed material in the water, or directly adhesively attaching a solid cube or tablet of feed material to the inner wall of the fish tank. Whichever method is used, all have serious drawbacks in that dissolving and precipitating of residues of the feed material in the water will inevitably occur, thus causing contamination. This fouling is usually fatal to the fish in the tank because the amount of air in the water of the fish tank should be kept relatively constant for proper growing of aquatic animals. Moreover, the main purpose of raising aquatic animals is aesthetically for exhibition, and once the water is fouled and residues accumulate in the fish tank, the aesthetic factor is seriously affected. Also several feeding periods daily are necessary in the traditional feeding methods. Besides the objection to manual handling of certain foods, constant attendance is required to keep all the fish regularly fed. Some fish, under certain circumstances, may eventually die because of food shortage. In addition, when the density of fish in a certain amount of water increases, the quantity of feed stuffs and the number of feeds daily must be increased proportionally. Thus, the demands for the constant attention and timely replenishment of food impose difficult conditions upon the raisers of aquatic animals today.

As to the effectiveness of feeding by the foregoing methods, it is time consuming and very uneconomical. A considerable excess amount of feed stuffs must usually be put in the fish tank because some will eventually dissolve or disperse in water. Moreover, the dissolved portions of the feed stuffs may not be acceptable to the fish because of the change in quality due to added moisture.

Since traditional feeding methods are neither scientific nor economical, raising fish on a large scale by manual feeding involves wasted labor. Today, the raising of aquatic animals for exhibition and decoration has become increasingly popular all over the world. Thus, a scientific and economical automatic feeder is urgently needed for trouble-free efficient raising aquatic animals.

The major object of the invention is to provide a new, simple yet ingenious automatic aquatic animal feeder, which meets this demand.

Another object of the invention is to provide a novel automatic feeder for fish adapted for ready removal mounting in an aquarium tank and capable of being speedily recharged with food.

A further object of the invention is to provide a novel automatic feeder for fish in an aquarium tank wherein a body of food is disposed in a container formed at the lower end, as with perforations or a screen, to provide feeding access to the food which descends by its own weight as the bottom is consumed to constantly present its lowermost layer to the feeding fish.

A further object of the invention is to provide a novel automatic feeder for fish in aquarium tanks wherein a body of food is loosely enclosed in a container having feeding access apertures at its lower end disposed below water level and air is continuously passed through the container to discharge into the water at the lower end of the container to pressurize the interior of the container to maintain the head of water within the container so low as to only surround the bottom of the food body.

A further object of the invention is to provide a novel automatic feeder for fish in aquarium or like tanks wherein a bar of food enclosed in a container having feeding access apertures in its lower open end contains or has operatively associated therewith vertically spaced bodies of a water reactive gas producing substance for controlling the rise of the water column around the lower end of the food bar.

Another object of the invention is to provide novel automatic feeding of fish in an aquarium wherein the food is a composite bar or cube having sections composed of one or more different foods in transverse layers that are successively presented for comsumption by the feeding fish, and having hard slowly soluble layers between such sections.

Another object of the invention is to provide a novel composite fish or like food bar consisting essentially of a plurality of different foods in layers that are preferably transverse.

A further object of the invention is to provide a novel bar of fish or like food containing longitudinally spaced bodies of a substance that will release or produce a relatively water insoluble gas when moistened with water.

BRIEF DESCRIPTION OF DRAWINGS

FIG. 1 is a side elevation partly in section showing a feeder according to a preferred embodiment of the invention installed within an aquarium tank;

FIG. 2 is a front elevation showing the feeder of FIG. 1;

FIG. 3 is a bottom plan view of the feeder of FIG. 1;

FIG. 4 is an enlarged generally perspective view showing a layered charge of food of preferred composition adapted for insertion into the feeder.

PREFERRED EMBODIMENTS

Figure 5:
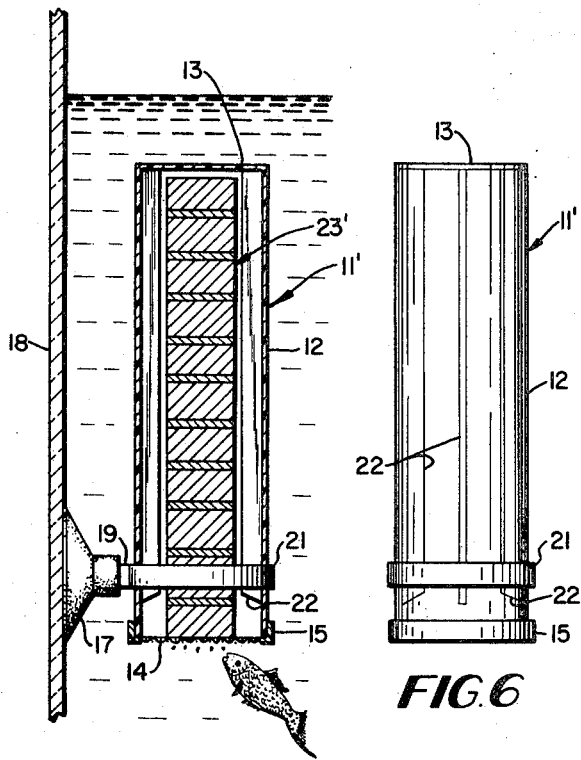
FIG. 5 is a side elevation partly in section showing a feeder according to a further embodiment.

The automatic feeder 11 shown in FIGS. 1–3 comprises a transparent cylindrical container 12 of plastic, glass or the like having a closed preferably integral top wall 13 and an open lower end across which extends a perforated element preferably in the form of a screen or net 14 mounted on a collar 15 having a force fit upon the lower end of container 12. Screen 14 serves as an outlet that provides controlled feeding access to the food within container 12.

The container 12 is operatively removably mounted within a glass or like tank 16 by means of a rubber suction cup 17 applied to the inner vertical surface of a tank side wall 18. Suction cup 17 is carried by a post 19 fixed to a mounting ring 21 surrounding and attached to the container 12. In some embodiments the container, mounting ring and post for mounting the suction cup may be an integral molded unit. Preferably the installed container may have its top wall below the water level in the tank as indicated, and its axis vertical.

Interiorly container 12 is provided with a series of circumferentially spaced longitudinal ribs 22 that serve as guide tracks for an elongated bar or cube 23 of fish food. As illustrated there may be four of these ribs equally spaced, with their inner ends squared off to lie within the envelope of a rectangle slightly larger than the corresponding rectangular cross section of the cube 23. However any number of ribs and any cross section of food bar 23 lies within the scope of the invention. Ribs 22 guide entry of the food cube into the container and descent until it bottoms on the screen 14, and this supports the food bar in stable upright position in spaced relation to the container inner wall free for automatic downward displacement as the lower end is consumed by the fish. The transparent container provides visual indication of the available amount of food in the container.

In a useful embodiment the guide passage defined by the inner ends of ribs 22 terminates about two centimeters above the screen 14.

An air supply conduit 24 is fixed to extend through top wall 13 of the container to discharge air downwardly around the food cube and through the longitudinal spaces in the container. An air exhaust opening 25 is provided in the container wall above the level of screen 14. Air under suitable pressure is supplied continuously, as from a pump indicated at 26, through an adjustable pressure regulating valve 27.

Air is therefore constantly pumped into the container where it maintains the interior of the container at a desired pressure that effectively constantly counterbalances the tendency of water to rise up through the container open end into the container. The pressure is adjustably regulated at 27 to permit ascent of a column of water within the lower end of the container only high enough to surround one or a few layers at the lower end of the body of food, so that the upper layers of food remain dry to maintain their quality until they are automatically lowered into feeding position. This also prevents the lower end of the container from becoming packed tight with moistened compacted food. Excess air escapes the container mainly through opening 25 which is located above the level of the water column within the container. This minimizes the amount of air under pressure discharged through the feeding screen, and therefore avoids harmful excess air being sucked in by the feeding fish.

Pump 26 may be the conventional type used for regulating the air supply in conventional aquarium tanks, but here it not only aerates the water but it controls immersion of the food.

FIG. 4 shows a preferred body of fish food in the form of an elongated composite bar or cube 23 such as may be used in the feeder for insuring a proper or varied diet supplied at timed intervals to the feeding fish. The cube is rectangular in cross section and comprises vertically spaced layered sections of compressed readily softened edible food that may be different or arranged in repeated layer combinations. Preferably the food is of greater density than water so that in the assembly the bar will rest by its weight on screen 14.

For example the layers of readily softened food may comprise respectively freeze dried daphnia 31, freeze dried mosquito larvae 32, freeze dried tubifex worms 33, freeze dried brine shrimp 35, a mixture of muscle tissue and viscera of mamalian animals 35 and a chorella additive of fleshy worms 37. Several layers are grouped in vertically spaced sections with the spaced groups separated by a hard food layer 34.

The hard layer 34 may have some food value and is advantageously formed of a mixture of gelatin and dried tubifex worms or daphnia with a small amount of sand included. Another composition is a mixture of calcium sulfate with dried daphnia. These hard layers 34 soften and dissolve only very slowly in water, a 3/16 inch layer requiring about 20–22 hours to dissolve, and therefore they slow down or discourage eating. By providing a series of vertically spaced layers of this hard food in each cube 23 whereby the fish, after eating several successive layers of ordinary fish food such as tubifex worms, daphnia and the like, encounter a hard barrier layer 34, effective control and spacing of feeding times is obtained. A single cube of adequate length may thus supply adequate food for at least a week without any care or attention.

The container is charged by removing it from the tank, this being permitted by the suction cup and the still attached flexible air supply hose from the pump, removing the cap containing screen 14, dropping in the cube 23 and replacing the screen cap. The container may then be inverted and mounted by the suction cup at any vertical level within the tank, below the water line being preferable, but well above the tank bottom to allow the feeding fish to manouver.

The perforations or mesh of screen 14 are such that the fish swimming in the tank may nibble and suck at the lower moistened layer of food exposed therethrough, and as the lower layer is devoured the bar 23 will automatically feed down by gravity, always presenting only its lower layer to the fish through screen 14.

Referring to FIGS. 5–9, a container 11' which is preferably the same as container 11 above described except that top wall 13 is entirely imperforate and has no air access inlet, is similarly mounted in the water of the tank as by the suction cup 17. Container 11 encloses an elongated bar or cube of food 23' which rests on its lower end upon feed net 14 and automatically displaces downwardly by gravity as it is consumed, similarly to bar 23.

In this embodiment, which differs over that of FIGS. 1–3 in that an air pump is not used to maintain a water column balancing pressure within the container, air initially entrapped within the container positioned as in FIG. 5 will prevent rise of a water column within the container above objectionable limits. However, as the food bar is consumed, the reduction in volume would normally permit more water to enter the container until a condition is reached where the food bar will float and thereby become displaced above net 14 away from access to the feeding fish.

This problem is solved by incorporating within the food bar certain substances which when moistened will generate or release a water insoluble gas such as carbon dioxide, and this gas will exert a counterbalancing pressure within the container to effectively limit and control the height of the water column within the container. Thus the bar 23' will maintain its bottom end or net 14 as it is consumed.

Figures 6, 8:
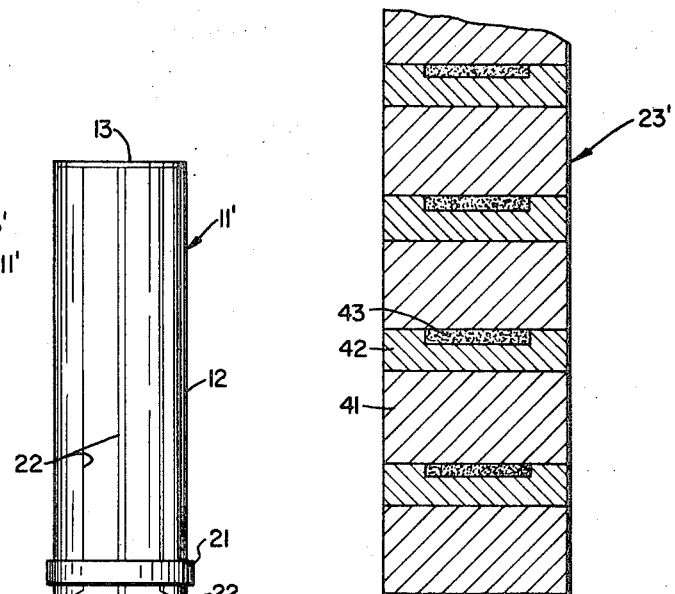
FIG. 6 is a front elevation of the feeder of FIG. 5.
FIG. 8 is an enlarged fragmentary view in section showing another form of layered food charge for a feeder.
Figure 7:
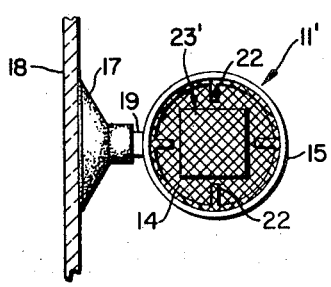
FIG. 7 is a bottom plan view of the feeder of FIG. 5.
Figure 9:
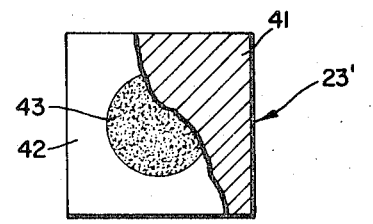
FIG. 9 is a plan view partly cut away to further illustrate the composition of the bar of foodstuffs of FIG. 8.

A preferred form of bar 23' is shown in detail in FIGS. 8 and 9. This bar is similar to bar 23 in that is comprises layer sections 41 of readily softened edible food vertically spaced by hard highly congealed food layer sections 42. The layer sections 41 may be multi-layered, for example consisting of different food value layers such as layers 35, 36 and 37 in bar 23, or they may be homogenous single food layers. The hard layer sections 42 are preferably of the same composition as hard layers 34 of bar 23. As in bar 23, the adjacent relatively soft and hard layer sections have their coextensive interfaces bonded together adhesively, either by the natural adhesives of the compressed foods or added vegetable type adhesives if required.

Bar 23' differs from bar 23 essentially only in that a body 43 of pressurized gas producing additive is disposed at each hard food layer 42, preferably near the interface with the soft food layer above it although exact location is not critical to that extent. It is adequate that a plurality of these additive bodies be incorporated within the food bar in vertically spaced relation, so that as the bar is consumed and lowers downwardly there will be periodic release of more gas to control the water column height around the lower end of the bar.

Preferably these bodies 43 are composed of sodium bicarbonate, sodium tartrate, sodium DL-tartrate, citric acid and equivalent materials that react with water to produce the gas.

In a useful construction where the feeder container has an inside diameter of about 22 millimeters water will tend to rise about 1 millimeter when a soft food layer section (20 mm × 20 mm × 15 mm) is consumed. The nature and amount of additive at 43 can readily be selected to produce a gas volume and pressure adequate to counterbalance this tendency of the water column to rise.

In the above described automatic feeders only the lowest portion of the cube of food in the container contacts the water at the region where it is accessible to the feeding fish. Therefore, there is little possibility of either fouling the water or inhibiting fish growth due to dissolution and precipitation of the feed stuffs.

Since feed dissolution is greatly minimized, no loss or dissipation of the nutriment of the feed is likely to happen. The feeder is totally automatic and it eliminates manual labor in feeding. The feeder is preferably made of plastic or glass and it is simple in its structure, thus being ideal for mass production.

To minimize deterioration of food during shipment and storage prior to use, a tight cap (not shown) may be fitted over collar 15 and this is discarded when the feeder is installed in the aquarium.

The embodiments of the invention in which an exclusive property or privilege is claimed are defined as follows:

1. An automatic feeder for fish and like aquatic animals in an aquarium tank comprising a food container adapted to be attached to an internal wall of the tank with an opening at its lower end disposed below water level in the tank, means extending across said opening providing animals within the tank feeding access to food in the container at said opening, and means providing gas under pressure within said container to limit the rise of water from the tank through said opening into the container.

2. In the automatic feeder defined in claim 1, said means providing gas under pressure within the container comprising means for passing compressed air from an external source through said container.

3. The automatic feeder defined in claim 2, wherein adjustable means is provided between a source of air pressure and said container for regulating the air pressure within said container.

4. The automatic feeder defined in claim 2, wherein said container is provided with an air discharge aperture above the water level within the container.

5. The automatic feeder defined in claim 2, wherein said container is a hollow tubular member with said opening in the bottom, a closed top wall for said container having an air inlet mounting a conduit leading to a source of air pressure, and an adjustable pressure regulator mounted in said conduit.

6. The automatic feeder defined in claim 1, wherein said food is a bar within said container and said gas providing means comprises at least one additive body carried by said bar and capable of releasing or producing gas when moistened by water.

7. An automatic feeder for fish and like aquatic animals in an aquarium tank comprising an elongated tubular food container adapted to be fixedly attached in substantially vertical upright position to an internal wall of the tank, said container being closed at its upper end and having an opening at its lower end disposed at a selected position below water level in the tank, and a cap detachably mounted on the lower end of said container mounting a screen disposed across said opening for providing animals within the tank feeding access to food in the container at said opening, said screen serving to support a body of food within the container while permitting feeding access to the lower portion of said food body.

8. The automatic feeder defined in claim 7, wherein said tubular container is formed with internal guide means maintaining and directing a body of food for gradual free descent toward said screen to continually present its lower portion for feeding access as the food is consumed.

9. The automatic feeder defined in claim 8, wherein said guide means comprises internal ribs on the container wall.

10. The automatic feeder defined in claim 7, wherein said body of food is an elongated bar having transverse layers of different food value whereby different foods are automatically provided as the bar descends when its lower portion is consumed.

11. The automatic feeder defined in claim 7, wherein said container comprises a transparent tube permitting visual determination of the food supply within the container without removal of the container from the tank.

12. The automatic feeder defined in claim 7, wherein suction cup means is used for attaching the container to the tank wall whereby the container may be readily removed, refilled and reinstalled within the tank.

13. The automatic feeder for fish and like aquatic animals comprising a tube for containing a body of food, a bottom end opening for the tube, a removable perforated feeding access cap fitting over said opening, a closed upper end wall having an inlet adapted for connection to a source of air under pressure and an air discharge aperture near the lower end of the tube.

* * * * *